United States Patent

Kettman

[11] Patent Number: 6,019,030
[45] Date of Patent: Feb. 1, 2000

[54] CONVEYOR-TYPE FOOD PRODUCT TOASTER

[75] Inventor: David L. Kettman, Lemont, Ill.

[73] Assignee: Prince Castle Inc., Carol Stream, Ill.

[21] Appl. No.: 09/203,014

[22] Filed: Dec. 1, 1998

[51] Int. Cl.[7] .................................................. A47J 37/08
[52] U.S. Cl. ........................... 99/386; 99/393; 99/443 C; 198/849
[58] Field of Search .............................. 99/386, 387, 391, 99/393, 443 C; 198/615, 848, 849

[56] References Cited

U.S. PATENT DOCUMENTS

| | | | |
|---|---|---|---|
| 2,007,862 | 7/1935 | Hurxthal | 198/849 |
| 2,172,194 | 9/1939 | Ehrgott . | |
| 3,329,256 | 7/1967 | Elgaway | 198/849 |
| 3,400,651 | 9/1968 | Hatch . | |
| 3,517,605 | 6/1970 | Hursch et al. . | |
| 3,528,362 | 9/1970 | Arnold, Jr. . | |
| 3,611,913 | 10/1971 | McGinley | 99/386 |
| 3,693,452 | 9/1972 | McGinley et al. | 99/386 |
| 3,835,760 | 9/1974 | Rekesius | 99/386 |
| 4,261,257 | 4/1981 | Henderson et al. | 99/386 |
| 4,281,594 | 8/1981 | Baker et al. | 99/386 |
| 4,488,480 | 12/1984 | Miller et al. | 99/386 |
| 4,530,276 | 7/1985 | Miller | 99/386 |
| 5,473,975 | 12/1995 | Bruno et al. | 99/386 |
| 5,673,610 | 10/1997 | Stuck | 99/386 |

*Primary Examiner*—Reginald L. Alexander
*Attorney, Agent, or Firm*—John R. Hoffman

[57] ABSTRACT

A toaster for bread-type food products includes a housing defining at least one toasting cavity. A toasting heater is operatively associated with the cavity. An endless chain-type conveyor is provided for conveying food products through the cavity. An endless belt is disposed about the conveyor to prevent the chain-type conveyor from imprinting the food products. The belt includes a seam, and a retention portion of the belt at the seam is engaged with the conveyor to prevent slippage between the belt and the conveyor.

14 Claims, 5 Drawing Sheets

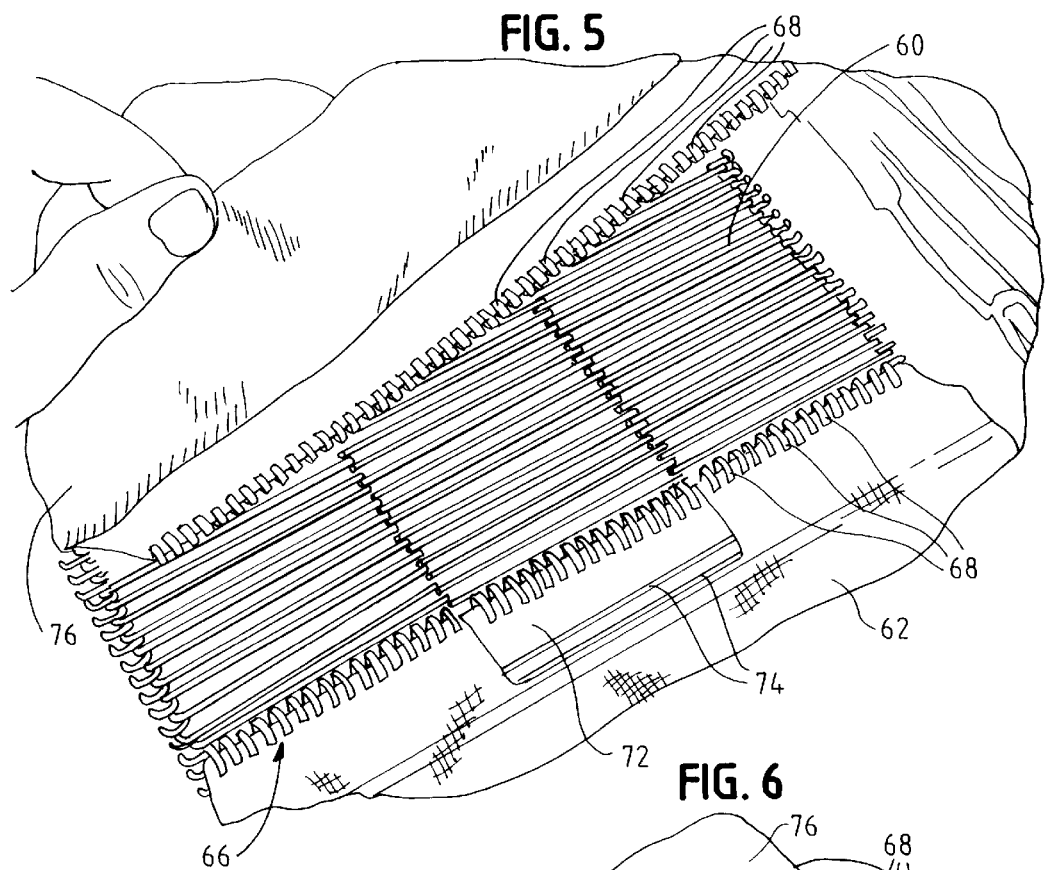
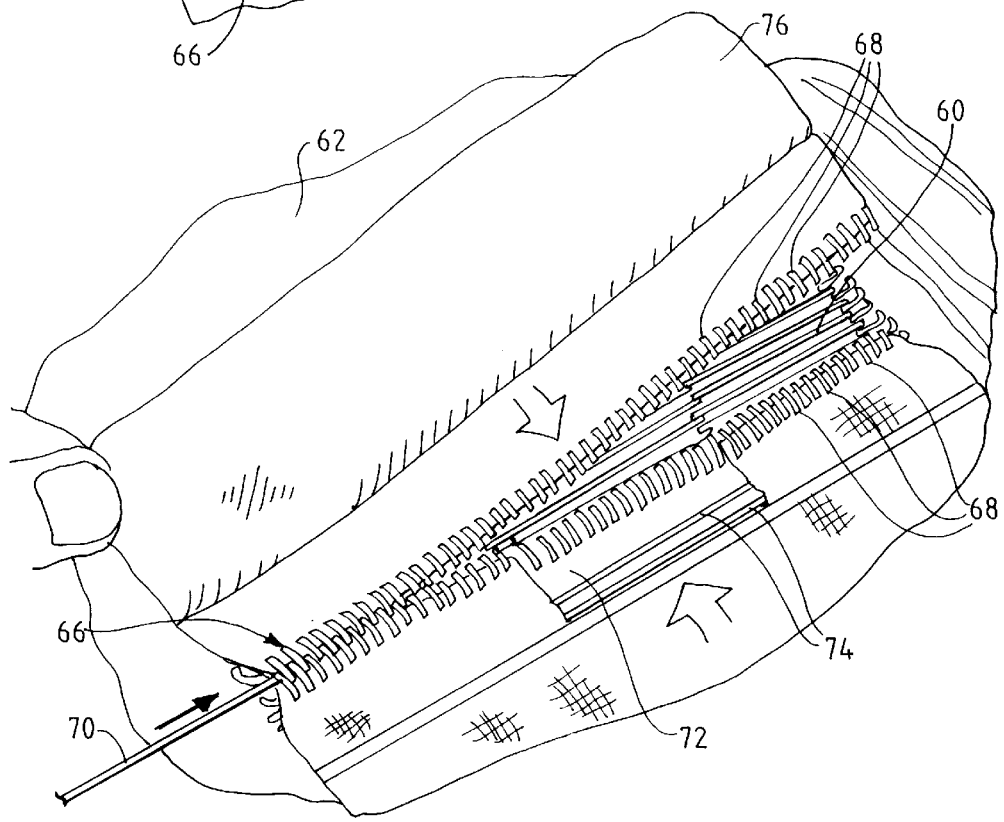

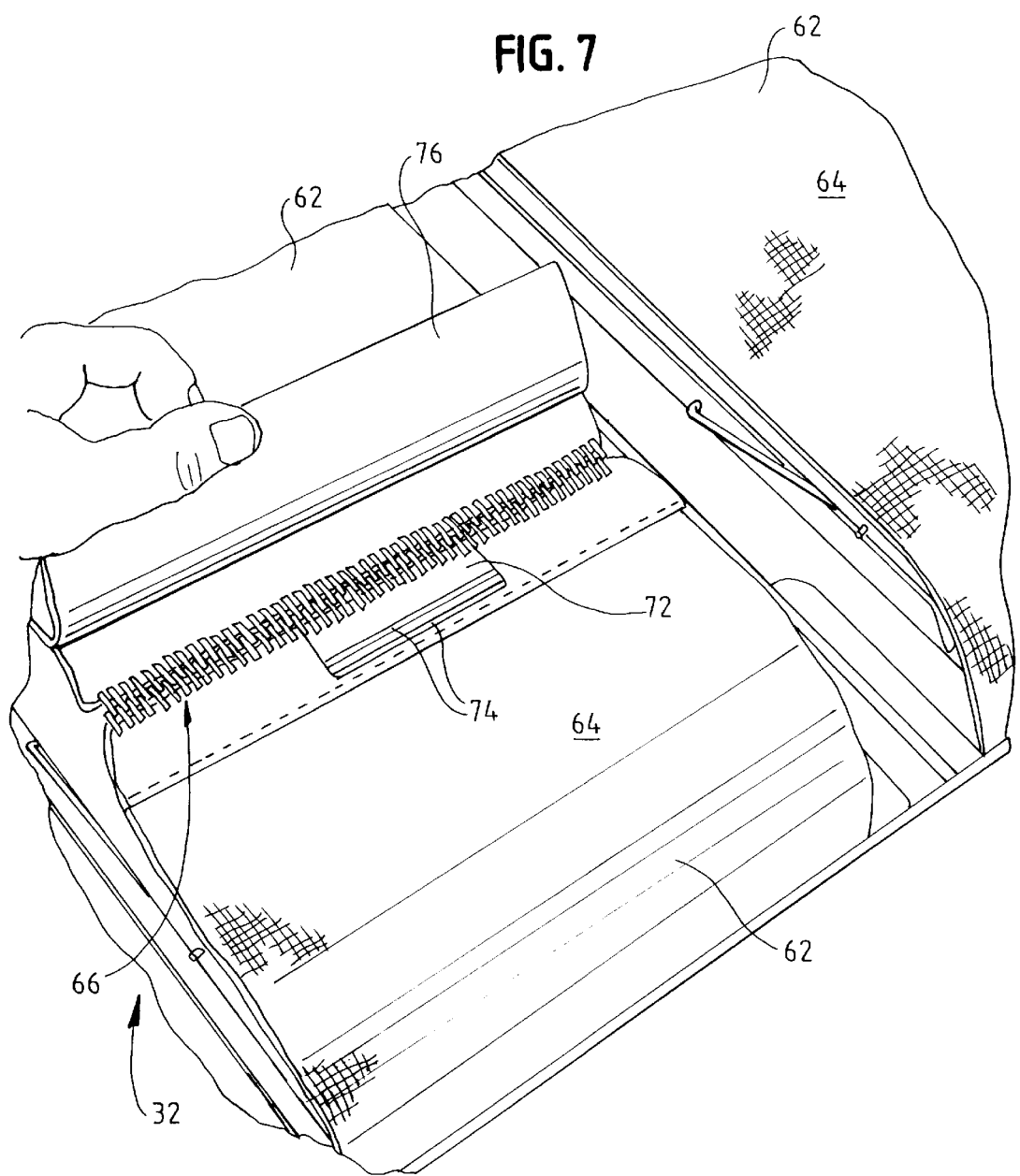

CONVEYOR-TYPE FOOD PRODUCT TOASTER

FIELD OF THE INVENTION

This invention generally relates to the art of electrical toasters such as for bread-type food products, and particularly to a conveyor-type toaster.

BACKGROUND OF THE INVENTION

Electrical toasters are used in a wide variety of applications ranging from small one or two slice home toasters to larger continuously operating commercial toasters. Such appliances are used to toast sliced bread, rolls, muffins, biscuits, bagels and similar food products. Commercial toasters are used widely in high volume restaurants, for instance.

One type of continuously operating toaster is a conveyor toaster which can continuously move food products seriatim through the appliance. A typical conveyor toaster includes a housing defining at least one toasting cavity. A conveyor defines one side of the cavity for conveying the food products therethrough. A toasting heater platen defines an opposite side of the cavity spaced from the conveyor to sandwich the food products therebetween as the products are conveyed through the cavity.

One of the problems with prior art conveyor toasters centers around the conveyor chain. A typical toaster conveyor includes one or more endless chains which have links or bars interconnected to provide a flexible, continuously movable loop about spaced rollers or pulleys. The links or bars of these conveyor chains are prone to create imprints or depressions on the bread-type food products. This leaves an undesirable aesthetic impression. Consequently, it has been known to cover the conveyor chains with a smooth endless belt which presents a generally flat surface to the food products. Such belts have created considerable problems because they are not easy to remove for cleaning purposes and they are prone to slip or have relative movement in relation to the conveyor chain which they surround. Slippage can cause considerable problems, because the timing in such toasters is very important. If a belt slips relative to the underlying conveyor chain, the food products will be exposed to the toasting heater longer than desired and, in fact, can result in burning the products. The present invention is directed to solving these various problems with a new and improved toaster conveyor covered by a smooth conveyor belt.

SUMMARY OF THE INVENTION

An object, therefore, of the invention is to provide a new and improved toaster for bread-type food products, of the conveyor type.

In the exemplary embodiment of the invention, the toaster includes a housing defining at least one toasting cavity. A toasting heater means is operatively associated with the cavity. An endless chain-type conveyor is provided for conveying food products through the cavity. An endless belt is disposed about the conveyor chain to prevent the conveyor chain from imprinting the food products. Means are provided to prevent slippage or relative movement between the belt and the chain-type conveyor.

As disclosed herein, the endless belt includes a seam. A retention portion of the belt at the seam engages the conveyor to prevent slippage therebetween. In the preferred embodiment, the retention portion of the belt comprises a flap intertwined with at least one link of the chain-type conveyor. The belt may include a transverse cover flap for covering the seam and the retention flap.

The invention is shown herein in a toaster of the type wherein the conveyor defines one side of the toasting cavity, and the heater means comprises a platen defining an opposite side of the cavity. However, the invention is equally applicable for other types of conveyor toasters.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 5 is a perspective view of one of the belts open at its seam, and with the retention flap intertwined with two of the bars of the conveyor chain;

FIG. 6 is a view similar to that of FIG. 5, with the connecting rod partially inserted into the seam of the belt; and FIG. 7 is a view similar to that of FIGS. 5 and 6, with the connecting rod completely closing the seam and with the cover flap lifted to expose the seam and the retention flap.

DETAILED DESCRIPTION OF THE PREFERRED EMBODIMENT

Figure 1:
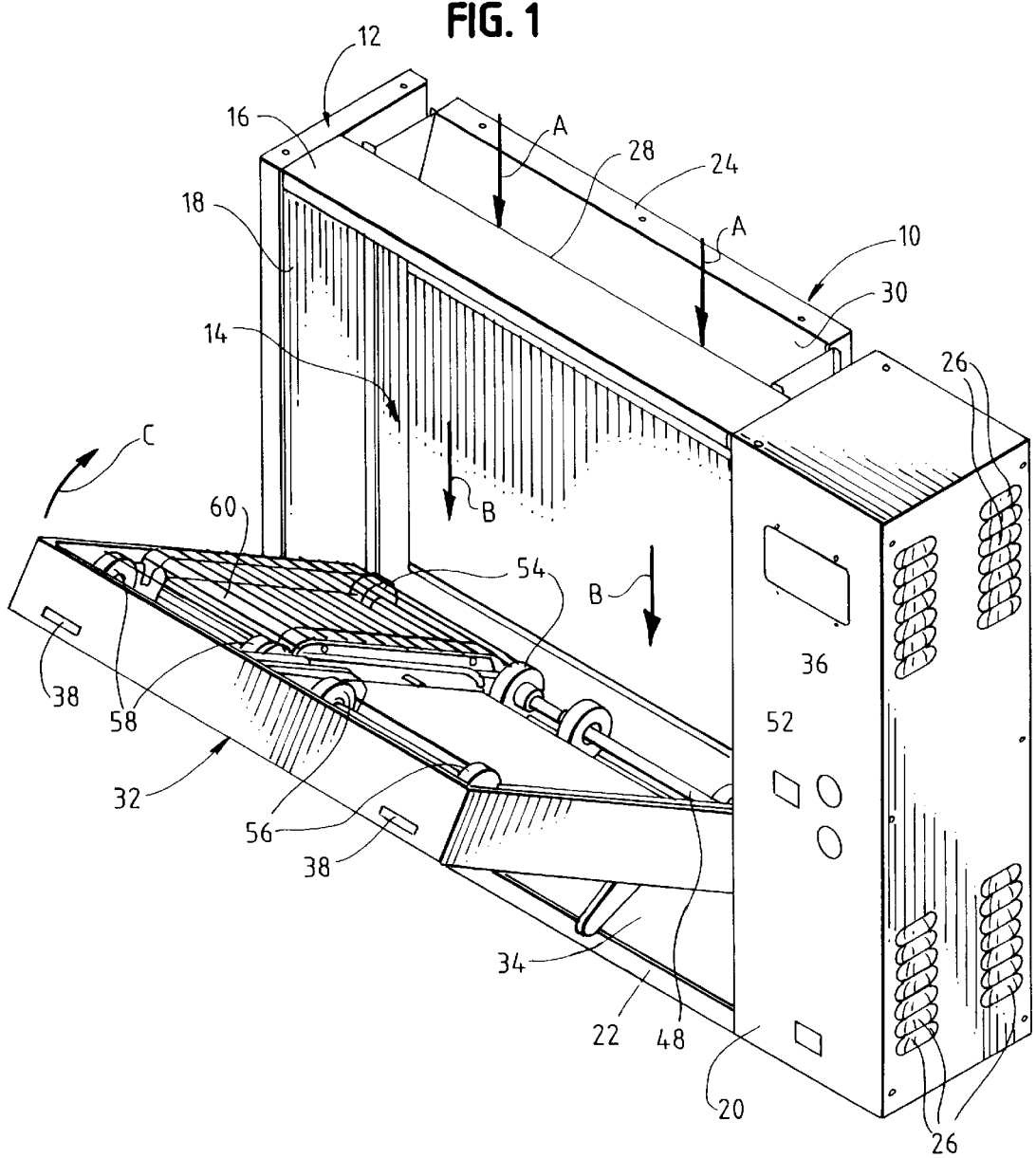
FIG. 1 is a perspective view of a conveyor toaster of the type with which the invention is applicable, with the conveyor assembly in open condition, with one of the conveyors removed to facilitate the illustration, and with the belt removed from the other conveyor.

Referring to the drawings in greater detail, and first to FIG. 1, the invention is embodied in a conveyor-type toaster, generally designated 10, for toasting bread-type food products, such as sliced bread, rolls, biscuits, muffins, bagels and the like. The toaster includes a housing, generally designated 12, defining at least one toasting cavity, generally designated 14. The housing includes a narrow top wall 16, opposite side walls 18 and 20, a bottom wall 22 and a rear wall 24. The entire housing 12 may be fabricated of sheet metal material, such as stainless steel, and at least top wall 16, side walls 18 and 20, bottom wall 22 and rear wall 24 are of a dual-wall construction to define insulating chambers within the walls. Vents 26 may be stamped and formed out of one or both of side walls 18 and 20 to allow circulation through the chambers and the escape of warm air therewithin. Side wall 20 is relatively large in cross-section to accommodate the motor, controls and other operative components of the toaster. Lastly, while the outside of housing 12 may have a brushed appearance for aesthetic purposes, the inside surfaces of top wall 16 and side walls 18 and 20 may have high reflective surfaces to enhance the efficiency of the warming apparatus.

It can be seen in FIG. 1 that top wall 16 is narrower than side walls 18 and 20 to define a space 28 between the rear edge of the top wall and rear wall 24. This space defines a mouth through which food products can be inserted downwardly in the direction of arrows "A" into toasting cavity 14. A ramp 30 is formed immediately inside the top of rear wall 24 to facilitate guiding the food products through mouth 28 into the toasting cavity.

Still referring to FIG. 1, a conveyor assembly, generally designated 32, defines one side of toasting cavity 14 for conveying food products therethrough in the direction of arrows "B" and outwardly of the toaster off of a ramp 34. A toasting heater platen, generally designated 36, defines the opposite side of toasting cavity 14, spaced from conveyor assembly 32, to sandwich the food products between the platen and the conveyors as the products are conveyed through toasting cavity 14. Conveyor assembly 32 is shown in its open condition in FIG. 1. The conveyor assembly is pivotally mounted on housing 12, between side walls 18 and 20, by an appropriate pivoting mounting means so that the conveyor assembly can be moved to a closed position in the direction of arrow "C". Appropriate detent latches (not visible in the drawings) can be provided on the underside of top wall 16 of the housing for engagement within latch openings 38 at the top of the conveyor assembly.

Figure 2:
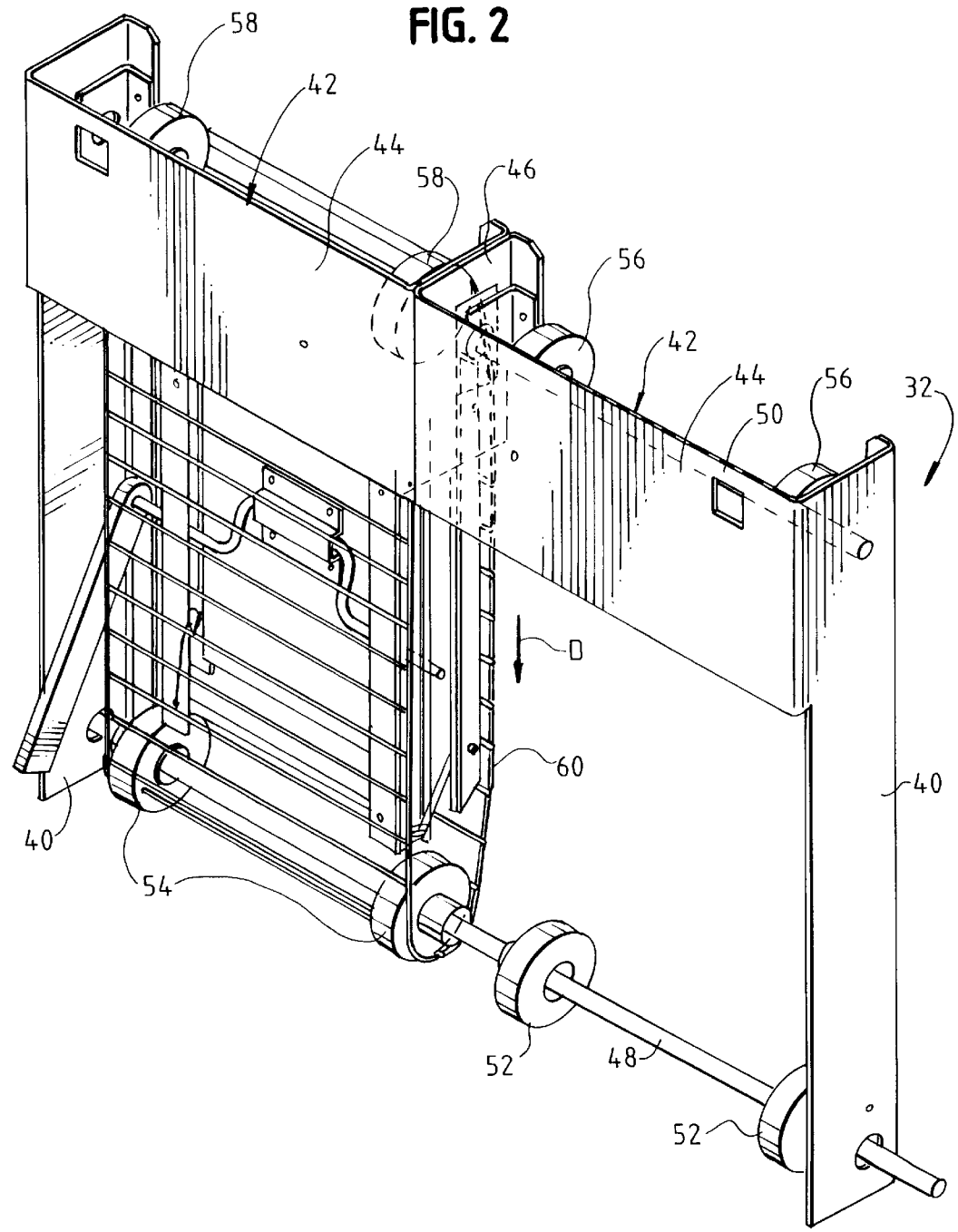
FIG. 2 is a perspective view of the conveyor assembly isolated from the toaster, again with one of the conveyors removed and the belt removed from the other conveyor.

Referring to FIG. 2 in conjunction with FIG. 1, conveyor assembly 32 includes a frame having side walls 40. The side walls actually are on the outside of a pair of generally U-shaped frame members, generally designated 42, which include cross portions 44 extending inwardly from side walls 40 and joined together by flanges 46. A drive rod 48 is journalled through side walls 40 near the bottom thereof, and an idler rod 50 is journalled between side walls 40 at the top thereof. A first pair of drive sprockets 52 are fixed to drive rod 48 at one side of the conveyor assembly, the right-hand side as viewed in FIGS. 1 and 2. A second pair of drive sprockets 54 are fixed to the drive rod at the left-hand side thereof. Similarly, a pair of idler sprockets 56 are mounted at the right-hand side of idler rod 50, and a pair of idler sprockets 58 are mounted at the left-hand side of idler rod 50. Although only one conveyor chain 60 is shown in the drawings, a continuous conveyor chain (not shown) is wrapped around drive sprockets 52 and idler sprockets 56. Continuous conveyor chain 60 is wrapped around drive sprockets 54 and idler sprockets 58. An appropriate motor is mounted within side wall 20 and is drivingly connected to drive rod 48 for rotating sprockets 52 and 54 to simultaneously move the conveyors in the direction of arrow "D" (FIG. 2) to convey the food products through toasting cavity 14.

Figure 3:
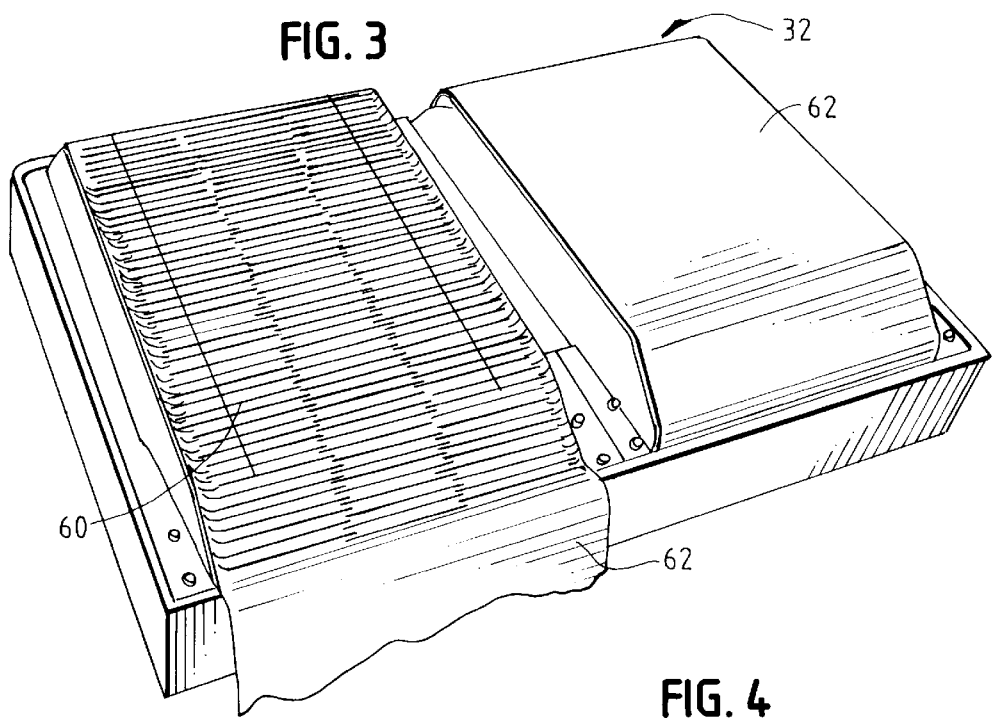
FIG. 3 is a perspective view of the toaster with the conveyor assembly in open condition, with both conveyors assembled and with a belt being assembled around one of the conveyors.
Figure 4:
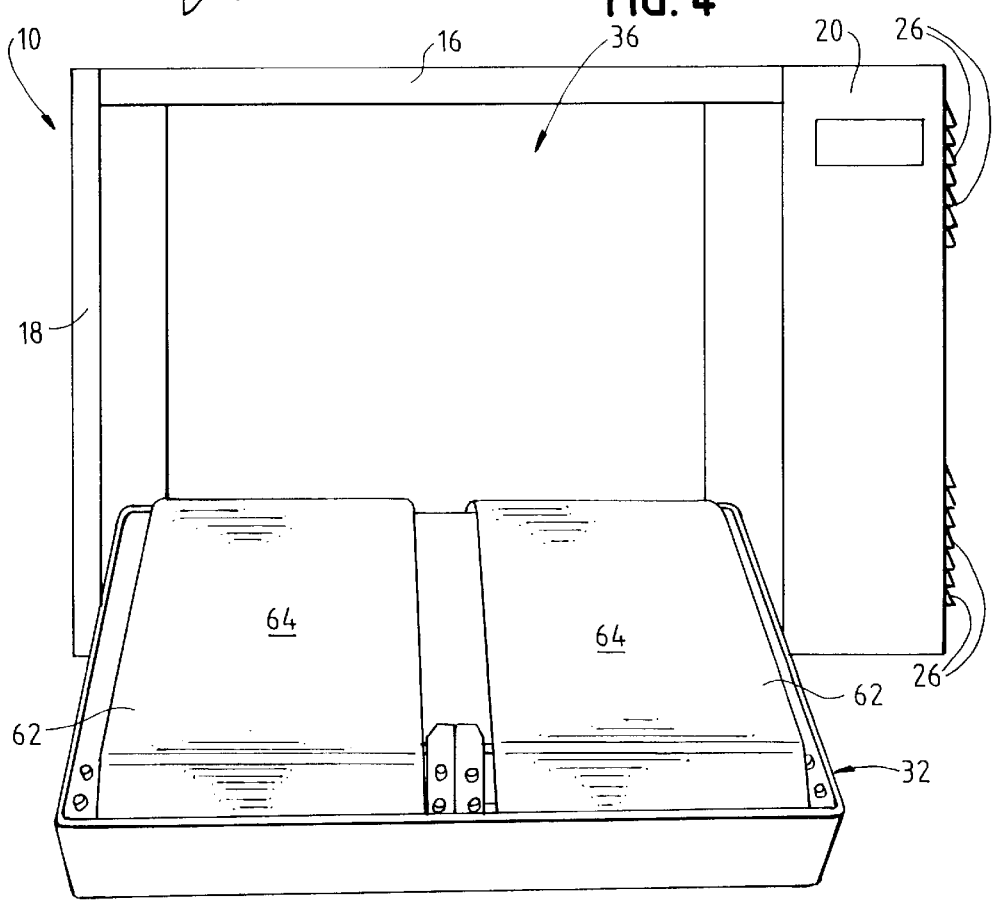
FIG. 4 is a perspective view similar to that of FIG. 3, with the belts installed on both conveyors.

Referring to FIG. 3, an endless belt 62 is shown disposed about the right-hand conveyor chain, and a second belt 62 is shown in the process of being wrapped around the left-hand conveyor chain 60. FIG. 4 shows both of the belts wrapped around the two conveyor chains to present smooth or flat surfaces in opposition to the flat surface of heater platen 36. Therefore, the links or rods of chain-type conveyors 60 will not leave impressions in the soft bread-type food products.

FIGS. 5 and 6 show that each endless belt 62 includes a seam, generally designated 66 (FIG. 6), of the "alligator" type wherein a plurality of spaced eyelet members 68 are fixed along each opposite edge of the belt at the seam. The eyelet members are interleaved as shown at the left-hand side of FIG. 6, and a connecting rod 70 is inserted through aligned holes in the interleaved eyelet members until the entire seam is closed as shown in FIG. 7.

The invention includes a novel system for preventing slippage or relative movement between conveyor belts 62 and conveyor chains 60. Specifically, as seen in FIGS. 5–7, a retention flap 72 is cut out of one edge of the belt at seam 66. The eyelets 68 along opposite edges of the belt along the seam continue to run through the edge of the retention flap. When the conveyor belt is assembled to the conveyor chain, flap 72 is threaded or intertwined beneath a pair of chain links or rods 74 as seen clearly in FIG. 5. Connecting rod 70 is inserted through all of the eyelet members 68 as shown in FIGS. 6 and 7, including the eyelet members of retention flap 72. Therefore, when the seam is fully closed by the connecting rod, about chain conveyor 60, the flap is effective to lock the belt to the chain against any slippage therebetween, because flap 72 is locked to at least a pair of the conveyor chain links or rods 74.

Finally, a cover flap 76 runs the full width of each conveyor belt 62 to cover seam 66, flap 72 and locking links 74 to prevent those components from leaving an impression in the soft food products.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A toaster for bread-type food products, comprising:

a housing defining at least one toasting cavity;

a toasting heater means operatively associated with the cavity;

an endless chain-type conveyor for conveying food products through the cavity; and an endless belt about the conveyor to prevent the chain-type conveyor from imprinting the food products, the belt including a seam, and a retention portion of the belt at the seam being engaged with the conveyor to prevent slippage between the belt and the conveyor.

2. The toaster of claim 1 wherein said conveyor defines one side of the cavity.

3. The toaster of claim 2 wherein said heater means comprises a platen defining an opposite side of the cavity.

4. The toaster of claim 1 wherein said retention portion of the belt comprises a flap intertwined with at least one link of the chain-type conveyor.

5. The toaster of claim 1 wherein said belt includes a transverse flap covering said seam.

6. A toaster for bread-type food products, comprising:

a housing defining at least one toasting cavity;

a toasting heater platen defining one side of the toasting cavity;

an endless chain-type conveyor defining an opposite side of the cavity for conveying food products through the cavity; and an endless belt about the conveyor to prevent the chain-type conveyor from imprinting the food products, the belt including a seam, and a retention flap portion of the belt at the seam being intertwined with at least one link of the chain-type conveyor to prevent slippage between the belt and the conveyor.

7. The toaster of claim 6 wherein said belt includes a transverse flap covering said seam.

8. A toaster for bread-type food products, comprising:

a housing defining at least one toasting cavity;

a toasting heater means operatively associated with the cavity;

a conveyor for conveying food products through the cavity;

a relatively smooth belt about the conveyor to present a smooth surface to the food products, the belt including a seam; and retention means operatively associated between the belt and the conveyor at said seam to prevent slippage therebetween.

9. The toaster of claim 8 wherein said conveyor defines one side of the cavity.

10. The toaster of claim 9 wherein said heater means comprises a platen defining an opposite side of the cavity.

11. The toaster of claim 8 including a flap covering said seam and the retention means.

12. The toaster of claim 8 wherein said retention means comprises a retention portion of the belt.

13. The toaster of claim 12 wherein said retention portion of the belt comprises a flap intertwined with a portion of the conveyor.

14. The toaster of claim 8 wherein said conveyor is a chain-type conveyor and said flap is intertwined with at least one link of the chain-type conveyor.

* * * * *